(12) United States Patent
Richards

(10) Patent No.: US 8,504,476 B2
(45) Date of Patent: Aug. 6, 2013

(54) SYSTEM AND METHOD OF CERTIFYING A CHECK

(75) Inventor: Andrew Richards, Ontario (CA)

(73) Assignee: NCR Corporation, Duluth, GA (US)

(*) Notice: Subject to any disclaimer, the term of this patent is extended or adjusted under 35 U.S.C. 154(b) by 56 days.

(21) Appl. No.: 13/228,164

(22) Filed: Sep. 8, 2011

(65) Prior Publication Data

US 2013/0066777 A1   Mar. 14, 2013

(51) Int. Cl.
*G06Q 40/00* (2012.01)

(52) U.S. Cl.
USPC .............................................. 705/42; 705/35

(58) Field of Classification Search
USPC ...................................................... 705/35–42
See application file for complete search history.

(56) References Cited

U.S. PATENT DOCUMENTS 8,032,457 B2 * 10/2011 Ostrovsky ........................ 705/40

* cited by examiner

*Primary Examiner* — Thu Thao Havan
(74) *Attorney, Agent, or Firm* — Paul W. Martin

(57) ABSTRACT

A system and method of certifying a check which involves a captured image of the check. An example method includes receiving by a first computer a request from a second computer to certify a check from a payer to a payee, the check serving to withdraw funds from an account of the payer, receiving by the first computer an image file containing an image of the check from the second computer, obtaining an account number and an amount from the image file by the first computer, determining using the account number whether funds equal to the amount are in the account, and when funds equal to the amount are in the account, putting a hold on the funds equal to the amount and issuing a certification number and a password by the first computer.

22 Claims, 2 Drawing Sheets

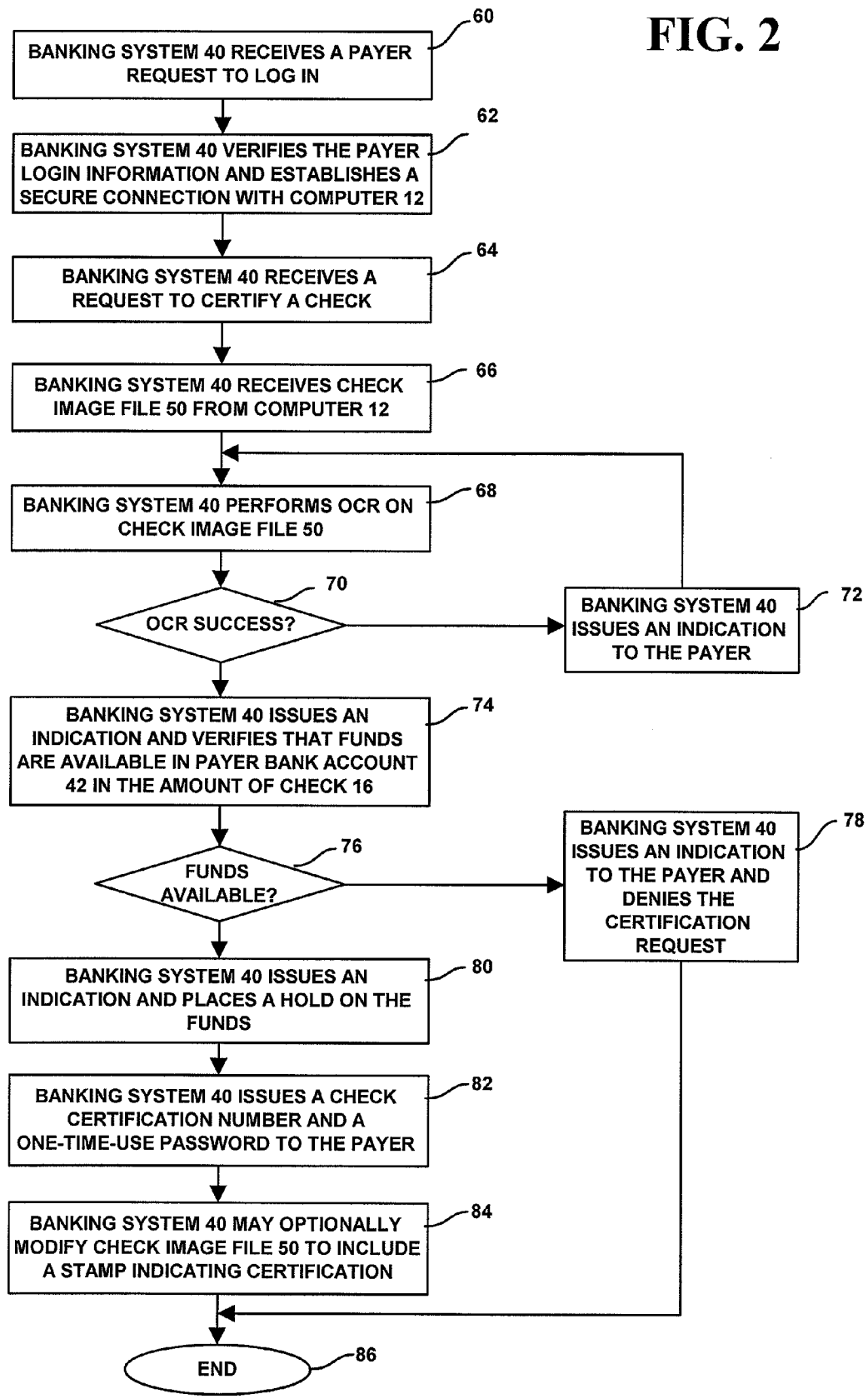

SYSTEM AND METHOD OF CERTIFYING A CHECK

BACKGROUND

The present invention relates to check certification and more specifically to a system and method of certifying checks.

A certified check is a type of check where a bank verifies and certifies that sufficient funds exist in the account of the payer to cover the amount of the check.

Currently, check certification can only be done at a bank.

Therefore, it would be desirable to provide a system and method of certifying checks from other locations via personal computer, mobile phone, or at an automated teller machine (ATM).

SUMMARY

In accordance with the teachings of the present invention, a system and method of certifying checks is provided.

An example method includes receiving by a first computer a request from a second computer to certify a check from a payer to a payee, the check serving to withdraw funds from an account of the payer, receiving by the first computer an image file containing an image of the check from the second computer, obtaining an account number and an amount from the image file by the first computer, determining using the account number whether funds equal to the amount are in the account, and when funds equal to the amount are in the account, putting a hold on the funds equal to the amount and issuing a certification number and a password by the first computer.

An example method of obtaining a certified check includes logging a payer of a check from the payer to a payee into a bank computer, the check serving to withdraw funds from a bank account of the payer, sending a request from the payer to the bank computer to certify the check, sending an image file containing an image of the check to the bank computer, and receiving a certification number and a password from the bank computer following certification by the bank computer.

BRIEF DESCRIPTION OF THE DRAWINGS

FIG. 2 is a flow diagram illustrating a check certification method.

DETAILED DESCRIPTION

Figure 1:
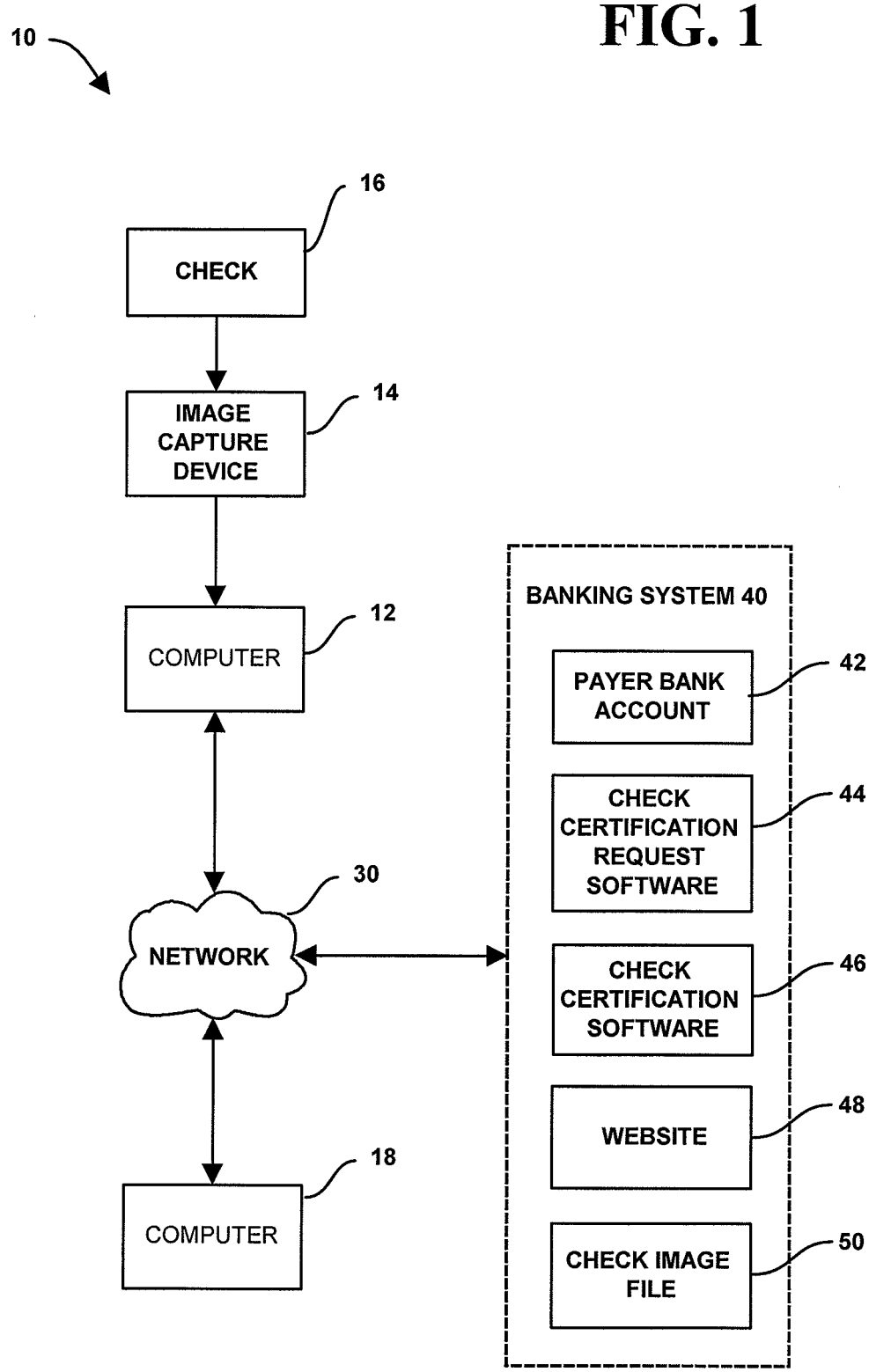
FIG. 1 is a block diagram of a check certification system.

Turning now to FIG. 1, system 10 primarily includes computer 12 and computer 18. A payer uses computer 12 to obtain a certified check. A payee uses computer 18 to accept the certified check.

Computers 12 and 18 include a processor, memory, and program and data storage. Computers 12 and 18 may execute an operating system such as a Microsoft operating system. Computers 12 and 18 execute other computer software that may be stored in a computer readable medium, such as a memory.

Computers 12 and 18 further include graphics circuitry for connecting to a display, network circuitry for connecting to network 30, and other circuitry for connecting to other peripherals, such as a printer, an input device (e.g., a mouse, a keyboard, a touch overlay to the display), a card reader, a biometric reader, such as a fingerprint reader, and/or a barcode reader. Computer 12 may use such circuitry to connect image capture device 14.

Computers 12 and 18 may include, but not be limited to, a personal computer, a smart phone or other portable computing device, or a self-service terminal, such as a kiosk or automated teller machine (ATM). Computers 12 and 18 may be the same or different computers. Each of computers 12 and 18 may include one or more computers in a computer system or network.

Computers 12 and 18 may communicate with banking system 40 over a network connection, such as one which uses the TCP/IP protocol. Network 30 may include any combination of wireless or wired networks, including a global communication network, also known as the Internet.

In one example embodiment, computers 12 and 18 execute web browser software to allow the payer and the payee to display information in a format established by the World Wide Web (WWW or "web"). Web browser software may include commercially available web browser software, such as Microsoft® Internet Explorer web browser software.

Computer 12 is used by a payer to obtain certification for a check 16. Computer 12 captures an image of check 16 using image capture device 14 and sends a check image file 50 to banking system 40.

Computer 12 connects to a web server of banking system 40 which maintains payer bank account 42 through website 48. Computer 12 downloads web pages from website 48 that allow the payer to login, to upload check image file 50, to request certification of check 16, and to complete certification of check 16. The web pages may also facilitate control of image capture device 14 in order to capture an image of check 16.

Computer 12 may alternatively or in addition download application software to facilitate certification. For example, banking system 40 may provide check certification request software 44 for download through website 48.

In one example embodiment, check certification request software 44 may be written in a programming language such as the Java programming and be hosted within the browser software.

As another example, check certification request software 44 may include a script, such as JavaScript, combined with hypertext markup language (HTML) or other suitable web page language.

If computer 12 is a mobile computing device, such as a smart phone, check certification request software 44 may include a software applet written to be executed within the operating system of the smart phone.

Check certification request software 44 may operate image capture device 14 to facilitate a request for check certification. For example, check certification request software 44 may communicate directly with a software driver of image capture device 14.

As another example, check certification request software 44 may communicate indirectly with a software driver of image capture device 14 through a protocol or application programming interface (API), such as a TWAIN standard API.

Alternatively, check certification request software 44 may prompt the payer for a file containing an image 48 of check 16 previously captured by the customer using a different software application.

Image capture device 14 captures an image of check 16 and stores the image in image file 50. Image capture device 14 is coupled to computer 12 and may include a document scanner or camera.

For example, image capture device 14 may include a built-in camera within a mobile communication device, such as a smart phone.

As another example, image capture device 14 may include a document scanner attached to a personal computer via a universal serial bus (USB) or other connection.

As another example, image capture device 14 may include a check reader module of a kiosk or ATM.

Image file formats may include "TIF", "GIF", "JPG", "BMP", "PNG", or any other format as required by banking system 40. Banking system 40 may also require that image file 50 have a predetermined color depth and/or resolution. The payer must acquire and operate an image capture device 14 in satisfaction of these requirements.

Check 16 may include any document which serves as a written order directing a bank where the payer has a checking account to pay money. Check 16 is filled out and signed by the payer.

The payer maintains a bank account 42, including a checking account, with banking system 40. Banking system 40 maintains customer account information containing records of deposits, withdrawals, check and other transactions involving payer. Banking system 40 store login credentials for allowing the payer to access the information in payer bank account 42.

Banking system 40 executes check certification software 46, which automates certification after the request from the payer is received. Check certification software 46 performs optical character recognition (OCR) on check image file 50 to extract the amount and information identifying account 42. The information includes at least the account number. The OCR process may also extract the bank routing number and the check number. An example check 16 includes the bank routing number, the bank account number, and the check number as magnetic ink character (MICR) data.

Assuming that the OCR is successful, check certification software 46 verifies that funds are available in payer bank account 42 in the amount of check 16 and places a "hold" on the funds when sufficient funds are available. The "hold" ensures that sufficient funds continue to be available as the payer withdraws additional funds or writes other checks from account 42.

Check certification software 46 also issues a check certification number and a one-time-use password to the payer.

Banking system 40 includes a processor, memory, and program and data storage. Banking system 40 may execute an operating system such as a Microsoft operating system.

Banking system 40 may include a web server computer connected to the World Wide Web (WWW or "web") and provide web content, including web pages with software programs, such as check certification request software 44 and check certification software 46.

Web content may include different types of web content for different types of computers 12. For example, web content may include one type of web content for display screens of mobile devices, such as smart phones, another type of web content for conventional display screens of personal computers, and another type of web content for display screens of self-service terminals, such as kiosks and ATMs. The different types of web content may be accessed by connecting to the same or different web sites.

The payer provides check 16 to the payee, along with the check certification number and the one-time-use password, using any method or combination of methods of delivery. For example, the payer may use computer 12 to send the check certification number and the one-time-use password to computer 18 operated by the payee via an electronic mail (email) message or a simple message service (SMS) message. Alternatively, the payer may provide the payee with the check certification number and the one-time-use password verbally or in writing.

Computer 18 connects to website 48 via network 30 and downloads web pages from website 48 that allow the payee to login and to accept certification of check 16. The payee uses the check certification number and the one-time-use password to login. After the payee logs in, website 48 displays the image of check 16 with verification that check 16 has been certified, including payer funds are available in the amount of check 16. The payee can select to accept check 16 as certified.

Banking system 40 updates payer bank account 42 following cashing of check 16 by the payee.

Turning now to FIG. 2, an example check certification method is illustrated in detail beginning with step 60.

In step 60, banking system 40 receives a payer request to log in. The payer logs in with pre-established credentials associated with payer bank account 42.

In one example embodiment, computer 12 may execute web browser software which connects to website 48 to download web content, such as web pages. In another example embodiment, computer 12 may execute check certification request software 44 to connect to banking system 40. Combinations of the above two methods are also envisioned.

Banking system 40 may receive payer login information through a keyboard, touch screen, card reader, a biometric reader, or any combination thereof, depending upon the type of computer 12 and available peripherals.

For example, if computer 12 is a mobile communication device, such as a smart phone, the mobile communication device may receive customer login information through a touch or other keypad.

As another example, if computer 12 is a self-service terminal, such as a kiosk or ATM, the self-service terminal may receive customer login information through a card reader and a keypad.

As another example, if computer 12 is a personal computer, such as a home personal computer, the personal computer may receive customer login information through a keyboard.

In step 62, banking system 40 verifies the payer login information and establishes a secure connection with computer 12.

In step 64, banking system 40 receives a request to certify a check.

A payer can select check certification as option in a web page or by executing check certification request software 44.

In step 66, banking system 40 receives check image file 50 from computer 12.

A payer may also make a selection to upload a check image file 50, capture an image of check 16 to produce check image file 50 by operating image capture device 14, or a combination of both.

In step 68-70, banking system 40, using check certification software 46, performs optical character recognition (OCR) on check image file 50 to extract the amount and information identifying account 42.

If the OCR process fails to extract the information, banking system 40 issues an indication to the payer in step 72. The payer may try to capture another image of check 16 and upload another check image file 50. Operation returns to step 68.

Assuming that the OCR is successful, banking system 40 issues an indication and verifies that funds are available in payer bank account 42 in the amount of check 16 in step 74-76.

If sufficient funds are not available, banking system 40 issues an indication to the payer in step 78 and the certification request is denied and operation ends at 86.

Assuming that sufficient funds are available, banking system 40 issues an indication and places a hold on the funds in step 80.

In step 82, banking system 40 issues a check certification number to the payer and issues a one-time-use password to the payer.

In step 84, banking system 40 may optionally modify check image file 50 to include a stamp indicating certification. Operation ends at 86.

The payer sends or gives check 16 to the payee with the check certification number and the password.

In one example embodiment, the payer may enter information, such as address information, for facilitating sending of the certification number and the password to the payee via electronic mail message or text message. Computer 12 or banking system 40 may send the information.

The payee uses computer 18 to visit website 48, select a check verification option, and enter the check certification number and password. The payee can login without necessarily have an account managed by banking system 40. Using the certification number, banking system 40 identifies the check that was certified and provides an indication that check 16 was certified following entry of the password by the payee.

Banking system 40 may provide an image of check 16 from check image file 50 with one or more indicia of certification, such as the word "certified" or equivalent in the form of a message or stamp. Banking system 40 may modify check image file 50 to include the indicia. The payee can accept that check 16 has been certified. The payee may also print the verification of certification from website 48.

Although the present invention has been described with particular reference to certain preferred embodiments thereof, variations and modifications of the present invention can be effected within the spirit and scope of the following claims.

What is claimed is:

1. A method of certifying a check comprising:
   receiving by a first computer a request from a second computer to certify a check from a payer to a payee, the check serving to withdraw funds from an account of the payer;
   receiving by the first computer an image file containing an image of the check from the second computer;
   obtaining an account number and an amount from the image file by the first computer;
   determining using the account number whether funds equal to the amount are in the account; and
   when funds equal to the amount are in the account, putting a hold on the funds equal to the amount and issuing a certification number and a password by the first computer.

2. The method of claim 1, further comprising modifying the image in the image file to include an indication of certification.

3. The method of claim 1, wherein the step of receiving the request includes providing a web site by the first computer and receiving the request through the web site.

4. The method of claim 3, wherein the step of receiving the image file includes receiving the image file through the web site.

5. The method of claim 1, wherein the step of receiving the request includes providing a mobile application by the first computer and receiving the request through the mobile application.

6. The method of claim 5, wherein the step of receiving the image file includes receiving the image file through the mobile application.

7. The method of claim 1, wherein the obtaining step includes performing optical character recognition on the image file.

8. The method of claim 7, wherein the obtaining step further includes obtaining the bank routing number.

9. The method of claim 1, further comprising:
   receiving by the first computer a verification request from a third computer to determine whether the check has been certified; and
   providing an indication that the check has been certified.

10. The method of claim 9, wherein the step of receiving a verification request comprises:
    receiving a check certification number from the third computer;
    determining the check using the check certification number; and
    receiving a password from the third computer.

11. The method of claim 9, wherein the step of providing an indication comprises displaying an image of the check with an indicator of certification.

12. A method of certifying a check comprising:
    receiving by a bank computer a request from a payer computer to certify a check from a payer to a payee, the check serving to withdraw funds from a bank account of the payer;
    receiving by the bank computer an image file containing an image of the check from the payer computer;
    performing optical character recognition on the image file to obtain an account number and an amount by the bank computer;
    determining using the account number that funds equal to the amount are in the bank account by the bank computer;
    putting a hold on the funds equal to the amount and issuing a certification number and a one-time-use password by the bank computer;
    modifying the image in the image file to include an indication of certification by the bank computer;
    receiving a check certification number from a payee computer;
    determining the check using the check certification number by the bank computer;
    receiving the one-time-use password from the payee computer; and
    providing an indication that the check has been certified to the payee computer.

13. A method for obtaining a certified check, the method comprising:
    logging a payer of a check from the payer to a payee into a bank computer, the check serving to withdraw funds from a bank account of the payer;
    sending a request from the payer to the bank computer to certify the check;
    sending an image file containing an image of the check to the bank computer; and
    receiving a certification number and a password from the bank computer following certification by the bank computer.

14. The method of claim 13, further comprising:
    capturing an image of the check.

15. The method of claim 13, further comprising:
    displaying an image of the check with an indication of certification from the bank computer upon entry of the certification number and the password.

16. A system comprising:
   an image capture device for capturing an image of a check from a payer to a payee, the check serving to withdraw funds from a bank account of the payer; and
   a computer for logging the payer into a bank computer, for sending a request from the payer to the bank computer to certify the check, for sending an image file containing the image of the check to the bank computer, and for receiving a certification number and a password from the bank computer following certification by the bank computer.

17. The system of claim 16, wherein the computer comprises a mobile communication device.

18. The system of claim 16, wherein the computer comprises a personal computer.

19. The system of claim 16, wherein the computer comprises a self-service terminal.

20. A system comprising:
   an image capture device for capturing an image of a check from a payer to a payee, the check serving to withdraw funds from a bank account of the payer; and
   a computer for logging the payer into a bank computer, for sending a request from the payer to the bank computer to certify the check, for sending an image file containing the image of the check to the bank computer, and for receiving a certification number and a password from the bank computer following certification by the bank computer.

21. A computer program product, comprising a computer usable medium having a computer readable program code embodied therein, said computer readable program code adapted to be executed to implement a method for certifying a check, the method comprising:
   receiving a request from a computer to certify a check from a payer to a payee, the check serving to withdraw funds from an account of the payer;
   receiving an image file containing an image of the check from the computer;
   obtaining an account number and an amount from the image file;
   determining using the account number whether funds equal to the amount are in the account; and
   when funds equal to the amount are in the account, putting a hold on the funds equal to the amount and issuing a certification number and a password.

22. A computer program product, comprising a computer usable medium having a computer readable program code embodied therein, said computer readable program code adapted to be executed to implement a method for obtaining a certified check, the method comprising:
   capturing an image of a check from a payer to a payee, the check serving to withdraw funds from a bank account of the payer;
   logging the payer into a bank computer;
   sending a request from the payer to the bank computer to certify the check;
   sending an image file containing the image of the check to the bank computer; and
   receiving a certification number and a password from the bank computer following certification by the bank computer.

* * * * *